United States Patent
Bremser et al.

(12)

(10) Patent No.: US 6,201,043 B1
(45) Date of Patent: Mar. 13, 2001

(54) DISPERSION PRODUCT FOR PRODUCTING AN ELECTROPHORETICALLY PRECIPITABLE DIPPING VARNISH

(75) Inventors: Wolfgang Bremser, Münster; Frank Strickmann, Steinfurt; Günther Ott, Münster; Karl-Heinz Grosse-Brinkhaus, Notuln, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/242,146

(22) PCT Filed: Aug. 13, 1997

(86) PCT No.: PCT/EP97/04401

§ 371 Date: Apr. 27, 1999

§ 102(e) Date: Apr. 27, 1999

(87) PCT Pub. No.: WO98/07794

PCT Pub. Date: Feb. 26, 1998

(30) Foreign Application Priority Data

Aug. 22, 1996 (DE) .............................. 196 33 769

(51) Int. Cl.$^7$ ................ C08K 3/20; C08L 63/02
(52) U.S. Cl. ................ 523/407; 523/414; 523/418
(58) Field of Search ................ 523/407, 414, 523/418

(56) References Cited

U.S. PATENT DOCUMENTS

| 4,608,314 | 8/1986 | Turpin et al. |
|---|---|---|
| 5,260,354 | * 11/1993 | Kaylo et al. .................. 523/402 |
| 5,324,404 | 6/1994 | Ott et al. .................. 204/181.7 |

FOREIGN PATENT DOCUMENTS

| 44 12 187 A1 | 4/1994 | (DE) | .............................. C08F/20/42 |
|---|---|---|---|
| 0 074 634 A2 | 9/1982 | (EP) | .............................. C08G/59/14 |
| 0 253 404 A2 | 7/1987 | (EP) | .............................. C08L/63/00 |
| WO 91/09917 | 6/1991 | (EP) | . |
| WO 91/09917 | 7/1991 | (EP) | .............................. C09D/5/44 |
| WO 93/18099 | 9/1993 | (EP) | .............................. C09D/5/44 |
| 0 622 389 A1 | 4/1994 | (EP) | . |
| 0 505 445 B1 | 11/1994 | (EP) | .............................. C09D/5/44 |
| 2 091 737 | 1/1982 | (GB) | . |

OTHER PUBLICATIONS

English Derwent Abst ract for DE 4412187 A1.

* cited by examiner

*Primary Examiner*—Robert Dawson
*Assistant Examiner*—D. Aylward

(57) ABSTRACT

The invention relates to aqueous dispersions. They are obtainable by polymerizing an ethylenically unsaturated monomer or a mixture of ethylenically unsaturated monmers [sic] in an aqueous solution of an at least partially protonated epoxide-amine adduct. It is characterized in that the epoxide-amine adduct is for its part obtainable by reacting (A) a glycidyl ether of a polyphenol that contains on statistical average at least one epoxide group in the molecule, or a mixture of such glycidyl ethers, (B) a polygycidyl [sic] ether of a polyol that contains on statistical average more than 1.0 epoxide groups in the molecule, or a mixture of such polyglycidyl ethers, and (C) a compound that contains a primary amino group in the molecule, or a mixture of such compounds, to give the epoxide-amine adduct, components (A) and (B) being employed in a ratio of equivalents of from 1.0:0.5 to 1.0:8.0 and from 0.3 to 0.7 mol of component (C) being employed per equivalent of epoxide groups of (A) and (B).

19 Claims, No Drawings

DISPERSION PRODUCT FOR PRODUCING AN ELECTROPHORETICALLY PRECIPITABLE DIPPING VARNISH

BACKGROUND OF THE INVENTION

The present invention relates to aqueous dispersions which are obtainable by polymerizing an ethylenically unsaturated monomer or a mixture of ethylenically unsaturated monomers in an aqueous solution of an at least partially protonated epoxide-amine adduct, and to their use for preparing electrophoretically depositable coating materials. -Electrophoretically depositable coating materials are coating compositions with which it is possible by means of (usually cationic) electrodeposition coating to prepare coat films on an electrically conducting substrate. In the course of electrodeposition coating, the article to be coated is dipped in a bath containing the deposition coating material, the article being connected as anode or cathode and thus producing an electrical field in the bath. The process is usually operated with voltages of 50–500V. Under the action of the field, the deposition coating material is deposited on the article. It is self-evident that for this purpose the deposition coating material must have a certain conductivity, i.e. that the substances which form the coat film must migrate in the field. In this procedure, the amount of coating material deposited is directly proportional, in first approximation, to the amount of current supplied. Current is usually supplied until a predetermined thickness of the coat film is reached. Electrodeposition coating is used in particular for priming motor vehicle bodywork parts, and is generally operated cathodically. In the course of this description the term solution is used in its most general sense, in other words such that it refers not only to solutions in the customary sense but also to dispersions.

In a dispersion of the type mentioned at the outset, the ethylenically unsaturated monomer or the mixture of ethylenically unsaturated monomers forms polymers which ultimately contribute to the solids content of the electrodeposition coating material. The polymers are formed, for example, by emulsion polymerization. The term emulsion polymerization refers to a specific technique of polymerization, in which monomers which per se are insoluble in water are emulsified in water with the aid of emulsifiers and are polymerized using initiators. Emulsion polymerization per se is well known.

Since the dispersion concerned is an aqueous dispersion, its use is directed toward the technology of aqueous coating materials. In aqueous coating materials, the coating material contains water as "solvent".

A dispersion of the type mentioned at the outset is known from the literature reference WO 93/18099 (PCT/US93/01512). According to this prior art, ethylenically unsaturated monomers, namely dienes, for example butadiene, are polymerized in aqueous phase and in the presence of a cationic, surface-active polymer and also in the presence of regulators for the chain length. As cationic, surface-active polymers it is also possible in principle to employ protonized epoxide-amine adducts. Cationic compounds are employed as initiators. Resulting from the ethylenically unsaturated monomers, polymers are obtained whose mass-average molecular weight is 50,000 or less. The technical problem on which this prior art is based is to reduce the so-called cratering in the course of coating. The effects used to reduce cratering, however, bring with them disadvantages in other respects, namely a considerably impaired adhesion of subsequently applied coating films, especially when the coating films have a polar basis, such as fillers, for example. This is disruptive for obvious reasons. Limitation to a maximum of 40% solids content avoids excessive agglomeration and/or an excessive viscosity of the dispersion; however, this dispersion viscosity is not connected with the viscosity of the subsequent coat film during the stoving process.

For the viscosity of the coat film during the stoving process, the conditions are as follows: The coat film is in general composed of three components: the resin component, which comes from the binder dispersion; the grinding resin component, from the pigment paste; and the pigments. Of these, the resin components constitute the components of relatively low viscosity and the pigments constitute the high-viscosity (solid) components. When binders are used exclusively, therefore, a low-viscosity coat film is produced which shows marked retreat from the edges. Only by using pigment paste is the viscosity adjusted to the desired level. In this case the pigments act simply as "lumps" in a melt. This has nothing to do with the viscosity of the initial aqueous pigment paste, but depends exclusively on the volume concentration and on the specific properties of the pigment particles.

Because of the pigment particles, accordingly, the density of the finished coating is raised in a disruptive manner. A high density is disruptive since the deposition of the coating material is controlled in accordance with the film thickness to be obtained, and for the same film thickness a high-density film leads to greater consumption of deposition coating material and to an increase in the weight of the coated article.

DE 4412187 A1 [lacuna] fillers of polyacrylonitrile which are prepared by emulsion polymerization and are employed directly as a paste substitute. In the case of these fillers, styrene is added, albeit in a minor amount. The necessary use for acrylonitrile, however, is undesirable on toxicological grounds and is also expensive.

Against this background, the technical problem underlying the invention is to provide an aqueous dispersion which can be prepared using as large as possible an amount of styrene and which, consequently, avoids the disadvantages of the use of polyacrylonitrile.

To solve this problem the invention provides aqueous dispersions which are obtainable by polymerizing an ethylenically unsaturated monomer or a mixture of ethylenically unsaturated monomers in an aqueous solution of an at least partially protonated epoxide-amine adduct, the epoxide-amine adduct being obtainable by reacting (A) a glydicyl ether of a polyphenol that contains on statistical average at least one epoxide group in the molecule, or a mixture of such glycidyl ethers, (B) a polygycidyl ether of a polyol that contains on statistical average more than 1.0 epoxide groups in the molecule, or a mixture of such polyglycidyl ethers and (C) a compound that contains a primary amino group in the molecule, or a mixture of such compounds, to give the epoxide-amine adduct, components (A) and (B) being employed in a ratio of equivalents of from 1.0:0.5 to 1.0:8.0 and from 0.3 to 0.7 mol of component (C) being employed per equivalent of epoxide groups of (A) and (B). An epoxide-amine adduct of the abovementioned type is known per se from the literature reference EP 0505445 B1. -Examples of ethylenically unsaturated monomers are substances from the group "aliphatic or aromatic ethylene derivatives, alkyl acrylates, alkyl methacrylates, hydroxyalkyl acrylates, hydroxyalkyl methacrylates, halogenated forms of the monomers mentioned" or mixtures thereof, preferably diene-free compounds, especially styrene. Styrene is on the one hand available inexpensively and on the other hand can be used to prepare dispersions having outstanding properties. Examples of suitable acrylates of the general formula H$_2$C=CH—COOR are: methyl, ethyl, n-butyl and isobutyl acrylates. Examples of hydroxyalkyl acrylates are hydroxyethyl acrylate and hydroxypropyl acrylate. The preferred methacrylates of the general formula

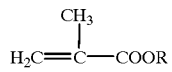

are: methyl, butyl, hexyl and octyl methacrylate. Examples of hydroxyalkyl methacrylates are hydroxyethyl and hydroxypropyl methacrylates.

Surprisingly, owing to the polymerization of the monomers in the presence of the specific epoxide-amine adduct indicated, the following advantages are achieved. First of all, it is not only the dispersion itself which is very stable but also the deposition coating material which is prepared using the novel dispersion. This also applies when comparatively large amounts of a novel dispersion are added to the electrodeposition coating material. Furthermore, good adhesion of a coating material prepared accordingly is achieved, both to the substrate and to coat films applied on top. The good adhesion properties are possibly based on a coupling of the polymerized monomers to the dispersion binder and/or epoxide-amine adduct employed in accordance with the invention, which is why these components remain bound in the polar binder of the electrodeposition coating material during the stoving operation. Advantageously, improvements in the mechano-technological properties of the coat film (adhesiveness, suitability as adhesion substrate, hardness, flexural elasticity, stone chip resistance, corrosion protection, etc.) are possible by the use of the novel dispersion alone. At the very least, however, virtually no impairments relative to electrodeposition coating materials with "conventional" pigment pastes are observed. Finally, surprisingly, there is in fact an improvement in the corrosion protection for the substrate. Of particular importance from an economic standpoint, moreover, is that it is possible to operate without dienes. The term without dienes or diene-free means that there are virtually no dienes in the monomers. This essentially makes it possible to work with styrene, the use of which can be highly cost-effective, without the need for expensive additives. A novel dispersion can be employed, and added to the binder of the electrodeposition coating material, in exactly the same way as a conventional pigment paste containing inorganic pigment particles, although it is possible to dispense entirely with inorganic pigment particles if color effects are not desired. By this is meant that, using a novel dispersion, the viscosity of the deposition coating material, and/or the coating film deposited in the bath, can be tailored to an optimum coating. Finally, this leads to improved edge protection on the coated article, since the coating is unable to flow so readily away from the edges during the stoving operation. To this extent a novel dispersion is a virtually equivalent (partial) substitute for "conventional" pigment pastes containing inorganic pigment particles, although relative to such pastes there is at least a reduced density of the finished coating, of 1.19 g/cm$^3$ or less, and an improved corrosion resistance.

The effects and advantages described above are all the more surprising since in general it is found that polymerization of the comparatively inexpensive styrene as ethylenically unsaturated monomer in the presence of neutralized [electro]deposition coating material binders and/or neutralized paste resins, according to experience to date when relatively large amounts of styrene are used, leads regularly to problems in the end product. On the one hand, the stability of the resulting coating material was impaired. On the other hand, known polystyrene-containing coating materials gave coat films having impaired mechano-technological properties and/or impaired adhesion to the substrate and/or to coat films applied on top. In other words, the use of relatively large amounts of polystyrene appeared to date to be highly inadvisable.

Because of the particular importance of the epoxide-amine adduct employed in the context of the invention, this adduct will be discussed in more detail below. The epoxide-amine adduct obtained from (A), (B) and (C) should preferably be free from epoxide groups. Where it still contains epoxide groups, it is judicious to react the remaining epoxide groups with compounds such as monophenols and amines, especially secondary amines (examples of compounds which are suitable for reaction with remaining epoxide groups are listed in EP-A-253404 on page 8 from line 28 to line 37 and page 9 line 16 to page 10 line 15).

Preferred epoxide-amine adducts are obtained if components (A) and (B) are employed in a ratio of equivalents 1.0:1.0 to 1.0:2.0, and if component (C) is employed in an amount such that there are from 0.4 to 0.6 mol of component (C) per equivalent of epoxide groups from (A) and (B). The number-average molecular weight of the novel grinding resins should be between 1000 and 100,000, preferably between 3000 and 15,000. Component (C) can be reacted in succession with (A) and (B) or—as is preferred—with a mixture of (A) and (B). The reaction of components (A), (B) and (C) can be carried out even at room temperature. To attain economic reaction times it is judicious to increase the reaction temperature, for example to from 60 to 130° C. The reaction of components (A), (B) and (C) is preferably carried out in an organic solvent such as, for example, ethylene glycol monobutyl ether or propylene glycol monobutyl ether. Neutralization is then carried out with an acid, for example acetic acid or lactic acid, followed by conversion to an aqueous dispersion or solution. The resulting dispersion or solution can then be processed further by generally well-known methods. It is also possible to mix the reaction product obtained from (A), (B) and (C), dissolved in an organic solvent, with pigments and, if desired, fillers, and to add acid and, if desired, water in order to process it further in to a pigment-containing dispersion. It is of course also possible to employ mixtures of the epoxide-amine adducts used in accordance with the invention.

As component (A) it is possible in principle to employ any glycidyl ether of a polyphenol that on statistical average contains at least one epoxide group in the molecule, or a mixture of such glycidyl ethers. As component (A) it is possible, for example, to employ glycidyl ethers of the general structural formulae (I) and (II) which are to be found on page 4 of EP-A-253404. As component (A) it is preferred to employ bisphenol A diglycidyl ethers, optionally modified with component (b) (see below), having an epoxide equivalent weight of from 180 to 3000, preferably from 180 to 1000. As component (A) it is particularly preferred to employ mixtures of glycidyl ethers which are obtainable by preparing—in the presence of a catalyst which catalyzes the reaction between phenolic hydroxyl groups and epoxide groups, from (a) a diglycidyl ether of a polyphenol, preferably a diglycidyl ether of bisphenol A having a number-average molecular weight of from 260 to 450, preferably from 370 to 380, or a mixture of such diglycidyl ethers, (b) an optionally substituted monophenol, preferably an alkylphenol having 1 to 18, preferably 4 to 12 carbon atoms in the alkyl radical, or a mixture of such monophenols and (c) a diphenol, preferably bisphenol A and/or a catalyst which catalyzes the reaction between aliphatic hydroxyl groups and epoxide groups—glycidyl ethers which have a number-average molecular weight of from 980 to 4000, preferably from 980 to 2000, and which on statistical average contain per molecule from 1.0 to 3.0, preferably from 1.2 to 1.6 epoxide groups and from 0.25 to 1.3, preferably from 0.4 to 0.9 phenyl ether groups originating from component (b). The preparation of the particularly preferably employed (A) component preferably takes place in organic solvents such as, for example, xylene, ethylene glycol monobutyl ether or propylene glycol monobutyl ether. The reaction temperatures are judiciously 100–180° C. Catalysts which catalyze the reaction between phenolic hydroxyl groups and epoxide groups are known to the skilled worker. Examples are: triphenylphosphine and the catalysts set out on page 9 in lines 6 to 9 of EP-A-253404. Component (c) is intended to ensure that glycidyl ethers with relatively high molecular weight are built up from component (a). This buildup can be obtained by chain extension with a diphenol, preferably with bisphenol A. However, the buildup can also be achieved by reaction of aliphatic hydroxyl groups, which are present in component (a) or in the reaction product of (a) and (b), with epoxide groups. In order to utilize this reaction specifically to build up the desired glycidyl ethers, it is necessary to employ catalysts (for example tertiary amines) which catalyze the reaction between aliphatic hydroxyl groups and epoxide groups. For the use of diphenol and a catalyst according to (c) it is possible to utilize both buildup reactions: the chain extension by way of the diphenol and the addition reaction between aliphatic hydroxyl groups and epoxide groups. The reaction with component (b) is intended to modify the preferred glycidyl ethers and to lead to the formation of aliphatic hydroxyl groups, which are required if buildup reactions are to take place by way of addition reactions of aliphatic hydroxyl groups to epoxide groups. Through the indication of the number-average molecular weight of the particularly preferred component (A) to be prepared and the indications of the epoxide groups present in component (A) and of the phenyl ether groups originating from component (b) it is possible without problems for the skilled worker to calculate the amounts of (a), (b) and (c) to be employed. If buildup reactions which take place by way of the reaction of aliphatic hydroxyl groups and epoxide groups are employed, the buildup reaction must be terminated after reaching the epoxide equivalent weight which can be calculated by the skilled worker from the target number-average molecular weight and the target epoxide group content. This termination is judiciously brought about by reducing the temperature and diluting the reaction mixture.

As component (B) it is possible in principle to employ any polyglycidyl ether of a polyol that contains on statistical average more than 1.0 epoxide groups in the molecule, or a mixture of such polyglycidyl ethers. As component (B) it is possible, for example, to employ the polyglycidyl ethers which are described in EP-A-253404 from line 42 of page 4 to line 13 of page 8. As component (B) it is preferred to employ polyglycidyl ethers of polyetherpolyols, particularly preferably diglycidyl ethers of polyetherdiols having number-average molecular weights of from 300 to 3000, preferably from 400 to 1200. Examples of particularly preferred polyglycidyl ethers are diglycidyl ethers of poly (ethylene glycol), poly(propylene glycol), poly(ethylene glycol propylene glycol) and poly(1,4 butanediol) [sic], the number-average molecular weights of the diglycidyl ethers being between 300 to [sic] 3000, preferably between 400 to [sic] 1200.

As component (C) use is made of a compound which contains a primary amino group in the molecule, or a mixture of such compounds. Component (C) is allowed to contain only one primary amino group in the molecule. In addition to the primary amino group, component (C) may include further functional groups, for example tertiary amino groups and hydroxyl groups. Component (C) is incorporated into the novel epoxide-amine adducts to form tertiary amino groups. In this case one primary amino group reacts with two epoxide groups and thus, extending the chain, links two molecules of components (A) and/or (B). Part of component (C) is also able to react with terminal epoxide groups to form secondary amino groups. As component (C) it is possible in principle to employ any compound containing one and only one primary amino group in the molecule. Examples are compounds of the general formula $H_2N$—$CR_1R_2$—$R_3$—$O(CHR_4$—$CHR_5$—$O)_nR_6$: in this formula $R_1$ and $R_2$ are hydrogen, alkyl groups or —CH—OH groups, $R_3$ is a linear or branched alkylene radical, in particular an alkylene radical having 1 to 3 carbon atoms [sic], $R_4$ and $R_5$ are hydrogen or alkyl radicals having 1 to 4 carbon atoms, $R_6$ is hydrogen, an alkyl, cycloalkyl or phenyl radical, preferably an alkyl radical having 1 to 6 carbon atoms, and n=0–5. Examples of compounds of this, type [sic] which can be employed are: ethanolamine, propanolamine, butanol-amine. 2-Amino-2-methyl-1-propanol ($H_2N$—$C(CH_3)_2$—$CH_2OH$), 2 amino-2-ethyl-1-propanol [sic] and ethoxylated and/or propylated ethanolamine or propanolamine, for example 2,2'aminoethoxyethanol [sic] ($H_2N$—$CH_2$—$CH_2$—O—$CH_2$—$CH_2OH$) and diethylene glycol mono(3-aminopropyl) [sic] ether ($H_2N$—$(CH_2)_3$—O—$CH_2$—$CH_2$—O—$CH_2$—$CH_2$—OH). As component (C) it is also possible to employ compounds which contain one primary and one tertiary amino group in the molecule. Examples are: N,N-dimethylaminopropylamine, N,N diethylaminoethylamine [sic] and the like. As component (C) it is also possible to employ primary alkylamines such as, for example, hexylamine. Optionally substituted aniline can also be employed as component (C). As component (C) it is preferred to employ hexylamine and N,N-dimethylaminopropylamine and also 2,2 aminoethoxyethanol.

A preferred embodiment of the invention is characterized in that the dispersions are obtainable by employing the ethylenically unsaturated monomer or the mixture of ethylenically unsaturated monomers and the at least partially protonated epoxide-amine adduct in a weight ratio of from 9.0:1.0 to 0.1:1.0, preferably from 5.0:1.0 to 1.0:1.0, particularly preferably from 2.1:1.0 to 3.5:1.0.

Specifically, styrene alone can be employed as ethylenically unsaturated monomer. As an alternative to this it is possible to employ, as a mixture of ethylenically unsaturated monomers, a mixture of styrene and at least one other, unsaturated monomer which is copolymerizable with styrene. In the latter case the mixture of ethylenically unsaturated monomers may advantageously contain at least 70% by weight, preferably at least 80% by weight and, with particular preference, at least 90% by weight of styrene.

In a development of the invention the ethylenically unsaturated monomer or the mixture of ethylenically unsaturated monomers can be free-radically polymerized using a water-insoluble initiator or a mixture of water-insoluble initiators. In this context it has proven highly judicious to employ the water-insoluble initiator or the mixture of water-insoluble initiators in an amount of from 0.1 to 10.0% by weight, preferably from 0.5 to 5.0% by weight and, with particular preference, from 0.3 to 3.0% by weight, based on the amount of ethylenically unsaturated monomer employed or on the amount of mixture of ethylenically unsaturated monomers employed. Suitable initiators are all customary initiators for free-radical chain polymerization. These include, in particular, azo compounds, peroxides, hydroperoxides and peresters, and also suitable redox initiators. Particular preference is given to the use of azoisovaleronitrile as initiator.

A preferred development of the invention is characterized in that the aqueous dispersions are obtainable by initially introducing at least 50% by weight, preferably at least 75% by weight and, with particular preference, 100% by weight of the overall amount of initiator employed and adding the ethylenically unsaturated monomer or adding the mixture of ethylenically unsaturated monomers over the course of not more than 3 hours, preferably over the course of not more than 2 hours and, with particular preference, over the course of not more than one hour.

The invention also provides a process for preparing aqueous dispersions according to claim 9, where the ethylenically unsaturated monomer or the mixture of ethylenically unsaturated monomers is polymerized in the aqueous solution of the at least partially protonated epoxide-amine adduct in accordance with claims 1 to 8.

The invention relates, finally, also to aqueous coating materials which comprise an aqueous dispersion according to one of claims 1 to 8, to a process for coating electrically conductive substrates, where a novel coating material is employed, and to the use of novel aqueous dispersions for preparing pigment pastes and aqueous coating materials. As binder component of the coating material it is possible to employ all common systems; examples thereof can be found, for example, in the literature references EP 0074634 and EP 0505445. Specifically it is advantageous to establish a proportion by weight of the solids content of the novel dispersion to the solids content of the deposition coating material binder of the overall system which is in the range of up to 50%. Preferably of up to 30%, most preferably of up to 20%. [sic]

The novel dispersions are preferably introduced into the electrodeposition coating material by way of a paste resin, for example a pigment paste. They can be added to the pigment paste preferably before, during and/or after the milling process, and can in principle, however, also be employed as sole grinding resin. Also possible is introduction via the binder dispersion of the coating material.

The viscosity of dispersion is arbitrary. It is for example in the region of more than 5000 mPas at 23° C. and with a solids content of from 50 to 60% by weight. In general, the viscosities can be up to 10,000 mPas. The polymerized ethylenically unsaturated monomers typically (but not necessarily) have a mass-average molecular weight of more than 100,000. Specifically, the polymer particles obtained in the process advantageously have a size of up to 20 μm, preferably up to 10 μm. In order to establish these conditions it is useful if the solids content of the epoxide-amine adduct solution or dispersion is in the range from 45 to 60% and the temperature during the polymerization of the monomers is in the range from 70° C. to 90° C. The particle size can be measured, for example, with the aid of light microscopy. With a polymer particle size of this kind it is possible firstly to achieve the necessary dispersion consistency; secondly, the properties of the deposition coating are influenced positively by this means. A satisfactorily low density of the finished coating is achieved if the weight ratio of the solids content of the novel dispersion to the solids content of the deposition coating material binder of the overall system is, for example, in the region of up to 50%, preferably in the region of up to 30%, most preferably up to 20%. It is judicious if the epoxide-amine adduct in the composition is identical or similar in structure to the binder of the deposition coating material.

In a novel coating material it is also possible, in addition, to employ inorganic and/or organic pigments. Examples of inorganic pigments are titanium dioxide, iron oxide, carbon black, aluminum silicate, barium sulfate, aluminum phosphoromolybdate, strontium chromate, lead silicates or lead chromate. Examples of organic pigments are azo, triphenylmethane, carbonyl and dioxazine pigments. With the pigment particles, a "conventional" pigment paste is prepared in a customary manner, and can be mixed with a novel dispersion. The resulting mixture is then added to the deposition coating material binder in a customary manner and is metered. Furthermore, the fillers known to the skilled worker can be employed in the coating material. These include, inter alia, silicatic fillers (e.g. aluminum silicate, talc, siliceous earth, micaceous iron oxide, silicon carbide, quartz flour, kieselguhr), carbonatic fillers (e.g. calcium carbonate) and sulfatic fillers (e.g. barium sulfate, calcium sulfate). Finally, customary paint auxiliaries can be provided, for example plasticizers and other paint additives (e.g. dispersing aids, emulsifiers), thickeners and thixotropic agents, foam inhibitors, leveling agents and other assistants to counter surface defects, stabilizers and/or UV absorbers.

A novel dispersion can contain further additives, for example pigments, plasticizers, fillers or wetting agents. If pigments are added, then a dispersion which colors the coating material is obtained. If, on the other hand, no pigments are added, then a clear coat can be prepared with the dispersion.

A process for preparing a novel dispersion can be described in very general terms as follows. From 5 to 30 parts of epoxide-amine adduct, from 20 to 50 parts of water and from 0.1 to 10 parts of an initiator are mixed. If desired, it is also possible to add 1–10% of customary organic solvents. These can in particular comprise up to 5–10% of ethanol, which leads to evaporative cooling of the reaction mixture. Subsequently, from 20 to 60 parts of ethylenically unsaturated monomers, preferably styrene, alone or in a mixture with solvents, are metered in with a small supply of heat. In the course of this addition the temperature rises from an initial 80° C. to about 90° C., mainly as a result of the energy of reaction that is given off. The initiators of the polymerization reaction are preferably free radicals. With the novel process it is possible to prepare a dispersion or pigment paste having the advantageous properties described above.

In the text below the invention is illustrated in more detail with reference to examples for preparing a novel electrodeposition coating material.

EXAMPLE 1

Preparing a Crosslinking Agent for an Electrodeposition Coating Material.

10,462 parts of isomers and more highly functional oligomers based on 4,4'-diphenylmethane diisocyanate with an NCO equivalent weight of 135 g/eq (Lupranat® M20S from BASF AG; NCO functionality about 2.7; content of 2,2'- and 2,4'-diphenylmethane diisocyanate below 5%) are charged under nitrogen to a reactor. 20 parts of dibutyltin dilaurate are added, and 9626 parts of butyldiglycol are added dropwise at a rate such that the product temperature remains below 60° C. After the end of the addition the temperature is held at 60° C. for 60 minutes more and an NCO equivalent weight of 1120 g/eq is determined (based on solids content). After dilution in 7737 parts of methyl isobutyl ketone and addition of 24 parts of dibutyltin dilaurate, 867 parts of melted trimethylolpropane are added such that a product temperature of 100° C. is not exceeded. After the end of addition, reaction is allowed to continue for 60 minutes more. The batch is cooled to 65° C. and diluted simultaneously with 963 parts of n-butanol and 300 parts of methyl isobutyl ketone. The solids content is 70.1% (1 h at 130° C.).

EXAMPLE 2

Preparing a Precursor (AV1) of the Amine Component for an [Electro]Deposition Coating Material Binder The water of reaction is removed from a 70% strength solution of diethylenetriamine in methyl isobutyl ketone at from 110 to 140° C. The solution is then diluted with methyl isobutyl ketone until it has an amine equivalent weight of 131 g/eq.

EXAMPLE 3

Preparing an Aqueous Electrodeposition Coating Dispersion D Comprising a Prior Art Binder and the Crosslinking Agent from Example 1

In a reactor, 5797 parts of epoxy resin based on bisphenol A with an epoxy equivalent weight (EEW) of 188 g/eq are heated to 125° C. under a nitrogen atom sphere [sic] together with 1320 parts of bisphenol A, 316 parts of dodecylphenol, 391 parts of p-cresol and 413 parts of xylene and the mixture is stirred for 10 minutes. It is then heated to 130° C. and 22 parts of N,N-dimethylbenzylamine are added. The reaction batch is held at this temperature until the EEW has reached a value of 814 g/eq.

Then 7810 parts of the crosslinking agent (V1) as in Example 1 are added and the mixture is held at 100° C. Half an hour after adding the crosslinker, 198 parts of butylglycol and 1002 parts of sec-butanol are added. Immediately thereafter a mixture of 481 parts of the precursor (AV1) according to Example 2 and 490 parts of methylethanolamine are added to the reactor and the batch is conditioned at 100° C. After a further half an hour the temperature is raised to 105° C. and 150 parts of N,N-dimethylaminopropylamine are added.

45 minutes after the addition of the amine, 879 parts of Plastilit® 3060 (propylene glycol compound, BASF) and 45 parts of a customary additive are added, and the batch is diluted with a mixture of 490 parts of propylene glycol phenyl ether and 196 parts of sec-butanol and cooled to 95° C.

After 10 minutes, 14,930 parts of the reaction mixture are transferred to a dispersing vessel. In that vessel 455 parts of lactic acid (88% strength in water), dissolved in 6993 parts of water, are added with stirring. The mixture is then homogenized for 20 minutes before being diluted further with an additional 12,600 parts of water.

The volatile solvents are removed by distillation under vacuum and are then replaced by an equal amount of water.

The dispersion D possesses the following characteristics:

| | |
|---|---|
| Solids content: | 31.9% (1 hour at 130oC [sic]) |
| Base content: | 0.69 milliequivalent/g solids |
| Acid content: | 0.32 milliequivalent/g solids |
| pH: | 6.2 |
| Particle size: | 113 nm |

EXAMPLE 4

Preparing a Novel Dispersion

Example 4.1

Preparing an Epoxide-amine Adduct Solution Used in Accordance with the Invention In accordance with EP 0 505 445 B1, Example 1.3, an organic-aqueous solution of an epoxide-amine adduct is prepared, by reacting in a first stage 2598 parts of bisphenol A diglycidyl ether (epoxy equivalent weight (EEW): 188 g/eq), 787 parts of bisphenol A, 603 parts of dodecylphenol and 206 parts of butylglycol in the presence of 4 parts of triphenylphosphine at 130° C. until an EEW of 865 g/eq is reached. In the course of cooling, the product is diluted with 849 parts of butylglycol and 1534 parts of D.E.R. 732 (polypropylene glycol diglycidyl ether from DOW Chemical) and at 90° C. is reacted further with 266 parts of 2,2'-aminoethoxyethanol and 212 parts of N, N-dimethylaminopropylamine [sic]. After 2 hours the viscosity of the resin solution is constant (5.3 dpas; 40% strength in Solvenon® PM (methoxypropanol from BASF AG);

plate-cone viscometer at 23° C.) The batch is diluted with 1512 parts of butylglycol and the base groups are partially neutralized with 201 parts of glacial acetic acid, then the mixture is diluted further with 1228 parts of deionized water and discharged. This gives a 60% strength aqueous-organic resin solution whose 10% strength dilution has a pH of 6.0.

The epoxide-amine adduct solution (abbreviated to resin solution) is used below to prepare a novel dispersion.

Example 4.2

Preparing the Novel Dispersion

A stainless steel reaction vessel is charged with 20,791 parts by weight of the epoxide-ammine [sic] adduct described in 4.1 and 35,588 parts of deionized water. The contents of the reactor are heated to 80° C., and 42,767 parts of styrene are added over the course of one hour. During this time the temperature is held at 80° C. In a separate vessel, 427 parts of azoisovaleronitrile are mixed with 427 parts of toluene. Together they give the initiator, which can then be metered gradually into the reaction mixture. Preferably, however, all of the initiator is added at the beginning and is thus in a high excess. 4 hours after the addition of the styrene, in most cases less than 3 hours after the addition of the styrene, the reaction is at an end. Solids content of the resulting dispersion (60 min., 130° C.): 55%, viscosity 585 mpas.

Example 4.3

A stainless steel rection [sic] vessel is charged with 18,873 parts of the paste grinding resin, and with 37,532 parts of deionized water and 5.0 parts of ethanol. The contents of the reactor are heated to 800; 0.383 part of initiator tert butyl per 2-ethylhexanoate [sic] is added, and 38,411 parts of styrene are added over the course of one hour. During this time the temperature is held at 90° C. 4 hours after addition of the styrene the reaction is at an end. Solids content (60 min., 130° C.): 50%, viscosity 280 mpas.

EXAMPLE 5

Preparing a Pigment Paste for a Novel Electrodeposition Coating Material

First of all 280 parts of water and 250 parts of the resin solution described in Example 4.1 are mixed. Then 5 parts of carbon black, 67 parts of Extender ASP 200, 373 parts of titanium dioxide (TI-PURE R900, DuPont) and 25 parts of crosslinking catalyst (DBTO) are added and the mixture is mixed for 30 minutes under a high-speed dissolver stirrer. The mixture is subsequently dispersed in a stirred laboratory mill for 1 to 1.5 h to a Hegman fineness of 12 and is adjusted if appropriate with further water to the desired processing viscosity.

EXAMPLE 6

Preparing Novel Electrodeposition Coating Materials

The dispersion D (Example 3), the pigment paste (Example 5) and the novel dispersion (Example 4.2) are used to prepare the following electrodeposition coating baths:

|  | ECB1 | ECB2 | ECB3 |
|---|---|---|---|
| Dispersion D | 2373 g | 2135 g | 2017 g |
| Novel dispersion | — | 150 g | 220 g |
| Pigment paste | 599 g | 599 g | 599 g |
| Deionized water | 2028 g | 2116 g | 2164 g |

The resulting electrodeposition coating materials have a solids content of about 20% with an ash content of 25%.

Deposition at 300–330V and at a bath temperature of 30° C., and stoving (15 min. panel temperature 175° C.) gave smooth films with a thickness of 20–22 mm on phosphatized steel panels (BO 26 W 42 OC, Chemetall) which have been given a nonpassivating rinse. The test results are listed in the following table.

|  | EBC1 | EBC2 | EBC3 |
|---|---|---|---|
| Mechanical properties |  |  |  |
| Erichsen Indentation (mm) DIN 53156 | 5.0 | 5.5 | 5.5 |
| Reverse impact (inch pound) ASTM D 2794 | 60 | 160 | 160 |
| Flexure con. Mandrel (cm) ASTM D 522 | 4.5 | 3.0 | 3.0 |
| MP Ballshot at −20° C. (flaking in mm$^2$) MB Spec. LPV 5200.40701 | 11 | 8 | 8 |
| Corrosion |  |  |  |
| 10 cycles of climatic cycling test with typ. coat system (VDA 621-415) Subfilm corrosion mm | 2.05 | 0.95 | 1.10 |
| Edge creep (rating) | 2 | 2 | 0 |
| 15 cycles GM SCAB test (GM Spec. GME 60212) Subfilm corrosion mm | 1.5 | 1.1 | 1.0 |

The results demonstrate that there are no delamination phenomena with respect to the subsequent coat films.

What is claimed is:

1. An aqueous dispersion comprising the reaction product of polymerizing one or more ethylenically unsaturated monomers in an aqueous solution of an at least partially protonated epoxide-amine adduct, wherein the epoxide-amine adduct comprises the result of reacting:
   (A) a glycidyl ether of a polyphenol comprising on statistical average at least one epoxide group in the molecule, or a mixture of such glycidyl ethers,
   (B) a polyglycidyl ether of a polyol comprising on statistical average more than 1.0 epoxide groups in the molecule, or a mixture of such polyglycidyl ethers, and
   (C) a compound comprising a primary amino group in the molecule, or a mixture of such compounds,
   to give the epoxide-amine adduct, components (A) and (B) being employed in a ratio of equivalents of from 1.0:0.5 to 1.0:8.0 and from 0.3 to 0.7 mol of component (C) being employed per equivalent of epoxide groups of (A) and (B);
   and further wherein the one or more ethylenically unsaturated monomers are polymerized using a water-insoluble initiator or a mixture of water-insoluble initiators in an amount of from about 0.1% to about 10.0% by weight, based on the amount of the one or more ethylenically unsaturated monomers the polymerization being carried out by initially introducing at least about 50% by weight of the overall amount of water-insoluble initiator employed and adding the one or more ethylenically unsaturated monomers over the course of not more than about 3 hours.

2. The aqueous dispersion of claim 1, comprising the result of employing the ethylenically unsaturated monomer or the mixture of ethylenically unsaturated monomers and the at least partially protonated epoxide-amine adduct in a weight ratio of from 9.0:1.0 to 0.1:1.0.

3. The aqueous dispersion of claim 1 wherein the one or more ethylenically unsaturated monomer comprises styrene.

4. The aqueous dispersion of claim 1, comprising the result of employing, as the one or more ethylenically unsaturated monomers, a mixture of styrene and at least one other, unsaturated monomer which is copolymerizable with styrene.

5. The aqueous dispersion claim 4, characterized in that the one or more ethylenically unsaturated monomers contains at least 70% by weight of styrene, based on the total weight of the one or more ethylenically unsaturated monomers.

6. A process for preparing the aqueous dispersion of claim 1, comprising
   polymerizing the one or more ethylenically unsaturated monomers in the aqueous solution of the at least partially protonated epoxide-amine adduct,
   wherein the at least partially protonated epoxyide-amine adduct comprises the result of reacting (A) a glycidyl ether of a polyphenol comprising on statistical average at least one epoxide group in the molecule, or a mixture of such glycidyl ethers, (B) a polyglycidyl ether of a polyol comprising on statistical average more than 1.0 epoxide groups in the molecule, or a mixture of such polyglycidyl ethers and (C) a compound comprising a primary amino group in the molecule, or a mixture of such compounds, to give the epoxide-amine adduct, and employing components (A) and (B) in a ratio of equivalents of from 1.0:0.5 to 1.0:8.0 and from 0.3 to 0.7 mol of component (C) per equivalent of epoxide groups of (A) and (B);

and further wherein the one or more ethylenically unsaturated monomers are polymerized using a water-insoluble initiator or a mixture of water-insoluble initiators in an amount of from about 0.1 to about 10.0% by weight based on the amount of the one or more ethylenically unsaturated monomers the polymerization being carried out by initially introducing at least about 50% by weight of the overall amount of water-insoluble initiator employed and adding the one or more ethylenically unsaturated monomers over the course of not more than about 3 hours.

7. An aqueous coating material, comprising the aqueous dispersion of claim 1.

8. A process for coating electrically conductive substrates, comprising applying the aqueous coating material of claim 7 to an electrically conductive substrate.

9. A method of preparing pigment pastes and aqueous coating materials comprising the incorporation of the aqueous dispersion of claim 1.

10. An aqueous dispersion comprising the reaction product of polymerizing one or more ethylenically unsaturated monomers comprising at least about 80% by weight of styrene, based on the total weight of the one or more ethylenically unsaturated monomers, in an aqueous solution of an at least partially protonated epoxide-amine adduct, wherein the epoxide-amine adduct comprises the result of reacting:

(A) a glycidyl ether of a polyphenol comprising on statistical average at least one epoxide group in the molecule, or a mixture of such glycidyl ethers, (B) a polyglycidyl ether of a polyol [that] comprising on statistical average more than 1.0 epoxide groups in the molecule, or a mixture of such polyglycidyl ethers, and (C) a compound comprising a primary amino group in the molecule, or a mixture of such compounds, to give the epoxide-amine adduct, components (A) and (B) being employed in a ratio of equivalents of from 1.0:0.5 to 1.0:8.0 and from 0.3 to 0.7 mol of component (C) being employed per equivalent of epoxide groups of (A) and (B).

11. The aqueous dispersion of claim 10, comprising the result of employing the ethylenically unsaturated monomer or the mixture of ethylenically unsaturated monomers and the at least partially protonated epoxide-amine adduct in a weight ratio of from 9.0:1.0 to 0.1:1.0.

12. The aqueous dispersion of claim 10, comprising the result of employing, as the one or more ethylenically unsaturated monomers, a mixture of styrene and at least one other, unsaturated monomer which is copolymerizable with styrene.

13. The aqueous dispersion of claim 10, comprising the result of free-radically polymerizing the one or more ethylenically unsaturated monomers using a water-insoluble initiator or a mixture of water-insoluble initiators.

14. The aqueous dispersions of claim 13, comprising the result of employing the water-insoluble initiator or the mixture of water-insoluble initiators in an amount of from 0.1 to 10.0% by weight, based on the amount of the one or more ethylenically unsaturated monomers.

15. The aqueous dispersion of claim 14, comprising the result of initially introducing at least 50% by weight of the overall amount of initiator employed and adding the one or more ethylenically unsaturated monomers over the course of not more than 3 hours.

16. A process for preparing the aqueous dispersion of claim 10, comprising polymerizing the one or more ethylenically unsaturated monomers in the aqueous solution of the at least partially protonated epoxide-amine adduct, wherein the at least partially protonated epoxide-amine adduct comprises the result of reacting (A) a glycidyl ether of a polyphenol comprising on statistical average at least one epoxide group in the molecule, or a mixture of such glycidyl ethers, (B) a polyglycidyl ether of a polyol comprising on statistical average more than 1.0 epoxide groups in the molecule, or a mixture of such polyglycidyl ethers and (C) a compound comprising a primary amino group in the molecule, or a mixture of such compounds, to give the epoxide-amine adduct, and employing components (A) and (B) in a ratio of equivalents of from 1.0:0.5 to 1.0:8.0 and from 0.3 to 0.7 mol of component (C) per equivalent of epoxide groups of (A) and (B).

17. An aqueous coating material, comprising the aqueous dispersion of claim 10.

18. A process for coating electrically conductive substrates, comprising applying the aqueous coating material of claim 17 to an electrically conductive substrate.

19. A method of preparing pigment pastes and aqueous coating materials comprising incorporating the aqueous dispersion of claim 10.

* * * * *